(No Model.)
C. MARCHAND.
MANUFACTURE OF HYDROGEN PEROXIDE.
No. 273,569. Patented Mar. 6, 1883.
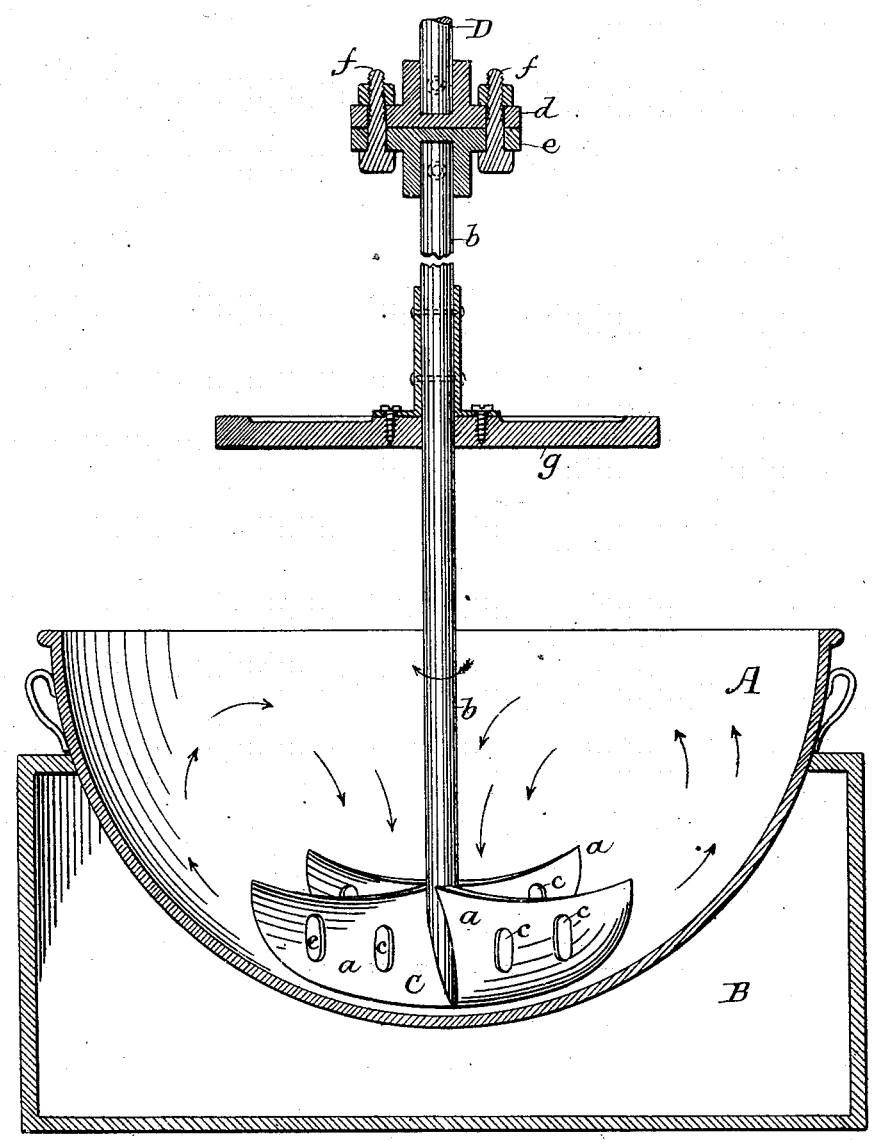
Witnesses:
E. E. Masson
Philip Mauro
Inventor:
Charles Marchand
by A. Pollok
his Atty

UNITED STATES PATENT OFFICE.

CHARLES MARCHAND, OF NEW YORK, N. Y.

MANUFACTURE OF HYDROGEN PEROXIDE.

SPECIFICATION forming part of Letters Patent No. 273,569, dated March 6, 1883.

Application filed August 2, 1882. (No model.)

*To all whom it may concern:*

Be it known that I, CHARLES MARCHAND, of New York city, in the county and State of New York, have invented a new and useful Improvement in the Manufacture of Hydrogen Peroxide, which improvement is fully set forth in the following specification.

This invention has reference to the manufacture of hydrogen peroxide or oxygenated water by addition of barium or calcium binoxide to an acid, (sulphuric, nitric, acetic, oxalic, hydrochloric, hydrofluoric, hydrofluosilic, and the like,) the binoxide having been mixed with water.

Heretofore hydrogen peroxide has been made by adding the barium or calcium binoxide, mixed with water, to the diluted acid, the binoxide being added from time to time in small quantities, the vessel in which the operation is conducted being set in a refrigerating medium, and the liquid being agitated or stirred to facilitate the reaction. The stirring has been performed by hand.

The present invention is based on the fact or discovery that the reduction of the barium or calcium binoxide takes place under conditions much more favorable in point of rapidity and yield when the acid to be neutralized is given a movement of rotation both vertically and horizontally by a screw or other suitable means, which at the same time creates both constant and ever-changing eddies, the said movement of rotation being imparted continuously during the addition of the binoxide.

The present invention consists, therefore, first, in imparting to the acid a movement of rotation, the time required for the chemical reaction being thereby lessened, while the reaction itself is more complete.

The apparatus shown in the accompanying drawing is preferably employed, and forms also part of the invention. A view in vertical section and elevation is given.

A is the receptacle for the acid; B, a jacketing-vessel for containing the refrigerant or cooling medium; C, the screw, and D a vertical power-shaft. The acid-receptacle need not be of any particular size, but a good capacity is from five hundred to one thousand gallons. It is preferably hemispherical, but may be cylindrical, frusto-conical, or other suitable form; and it is made of or lined with material adapted to resist the action of the acid. For use with hydrofluoric acid, a sheet-iron or, better, a copper vessel lined with lead may be used, or one of platinum, gold, or silver, or one otherwise rendered non-corrodible. The screw C is provided with helicoidal blades *a*, ordinarily two, three, or four in number, set obliquely on the arbor or screw-shaft *b*. The blades are preferably pierced with holes *c*. The screw is suspended in the receptacle A, being detachably connected with the lower end of the power-shaft D by the pieces *d e*—one fixed to the power-shaft and the other to the screw-shaft, and clamped together by the bolts *f*. On the screw-shaft, above the top of the receptacle A, is fixed a disk, *g*, of wood or other suitable material, which catches the oil from the bearings of the power-shaft, and other foreign matters that otherwise would be liable to fall into the receptacle. The power-shaft is suspended in its bearings by suitable collars, which enable it to support the screw C, and is driven from a horizontal shaft through beveled gearing, or by other well-known or suitable mechanical means. The length of the screw-shaft is such that the blades of the screw do not in operation touch or scrape the interior of the receptacle A. The jacketing-vessel B is of ordinary or suitable construction. The cooling medium commonly employed therein may be placed in it.

The vessel B being filled with the cooling medium, the proper quantities of acid and water (say twenty parts, by weight, of acid to one hundred parts of water, or other suitable proportions) are placed in the receptacle A. The screw C is put in motion, and the binoxide of barium or calcium, in the state of a more or less thick emulsion or milk, is added in small quantities. The revolving screw imparts a movement of rotation more or less rapid to the liquid, producing eddies therein and constantly changing the material, and the chemical reaction takes place very regularly and completely. Sufficient binoxide is added to secure the complete neutralization of the acid without rendering the hydrogen peroxide too alkaline. After a certain time, which varies with the quantity of the article manufactured and the amount of binoxide employed, and during which the screw may be stopped, but is preferably kept in revolution, the production of the hydrogen peroxide is finished. It only remains to allow the matters in suspension to settle and to decant the clear liquor.

If it is desired to obtain the hydrogen peroxide in a state of greater purity than results from the above, the clear liquor is subjected to special chemical treatment, which, as it constitutes no part of the present invention, need not be described.

I claim the new improvements herein described, all and several, to wit:

1. The method of making hydrogen peroxide by cooling the acid solution, imparting thereto a continuous movement of rotation, as well in vertical as in horizontal planes—such, for example, as imparted by a revolving screw in a receptacle—and adding to said acid solution the binoxide in small quantities while maintaining the low temperature and the rotary or eddying movements, substantially as described.

2. The combination of the receptacle, the screw suspended therein so as not to touch the bottom, and the protecting or covering disk carried by the screw-shaft, substantially as described.

3. The combination of the receptacle, the power-shaft, the screw, and the means for detachably connecting the said screw with said power-shaft and for suspending it therefrom in said receptacle, substantially as described.

4. The apparatus described, comprising in combination the receptacle for the acid, the jacketing-vessel, the power-shaft, the suspended screw, and the means for preventing foreign matter from falling into the receptacle, substantially as set forth.

In testimony whereof I have signed this specification in the presence of two subscribing witnesses.

CH. MARCHAND.

Witnesses:
R. S. HAYWARD,
G. H. PEARSALL.